United States Patent
Balsiger et al.

(10) Patent No.: US 12,259,031 B2
(45) Date of Patent: Mar. 25, 2025

(54) BALANCED HARMONIC DRIVE WITH OUTPUT SHAFT DISCONNECT

(71) Applicant: Hamilton Sundstrand Corporation, Charlotte, NC (US)

(72) Inventors: Derick S. Balsiger, Prescott Valley, AZ (US); Keith A. Bloxham, Gilbert, AZ (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 64 days.

(21) Appl. No.: 18/188,800

(22) Filed: Mar. 23, 2023

(65) Prior Publication Data

US 2024/0318708 A1 Sep. 26, 2024

(51) Int. Cl.
| | |
|---|---|
| *F16D 27/118* | (2006.01) |
| *B64C 13/38* | (2006.01) |
| *F16D 48/06* | (2006.01) |
| *F16H 37/12* | (2006.01) |
| *F16H 49/00* | (2006.01) |
| *F16H 57/021* | (2012.01) |
| *F16H 57/02* | (2012.01) |

(52) U.S. Cl.
CPC ........... *F16H 37/122* (2013.01); *B64C 13/38* (2013.01); *F16D 27/118* (2013.01); *F16D 48/064* (2013.01); *F16H 49/001* (2013.01); *F16H 57/021* (2013.01); *F16D 2500/10418* (2013.01); *F16D 2500/10462* (2013.01); *F16D 2500/1107* (2013.01); *F16H 2049/003* (2013.01); *F16H 2057/02034* (2013.01)

(58) Field of Classification Search
CPC ... F16H 49/001; F16D 2500/10; F16D 27/118
See application file for complete search history.

(56) References Cited

U.S. PATENT DOCUMENTS

| | | | |
|---|---|---|---|
| 4,237,751 A | 12/1980 | Davis | |
| 7,882,766 B2 * | 2/2011 | Kiyosawa | F16H 3/70 74/640 |
| 9,353,804 B2 | 5/2016 | Balsiger et al. | |
| 9,493,230 B2 * | 11/2016 | Balsiger | F16H 37/04 |
| 2015/0345606 A1 * | 12/2015 | Balsiger | F16H 49/001 74/405 |
| 2016/0010701 A1 | 1/2016 | Balsiger et al. | |
| 2017/0088252 A1 * | 3/2017 | Chavignier | B64C 13/341 |

FOREIGN PATENT DOCUMENTS

EP     4039586 A1     8/2022

OTHER PUBLICATIONS

European Search Reported issued in European Application No. 24165329.4 dated Jul. 30, 2024; 10 pages.

* cited by examiner

*Primary Examiner* — Stacey A Fluhart
(74) *Attorney, Agent, or Firm* — CANTOR COLBURN LLP

(57) ABSTRACT

A harmonic drive, having: a housing; an output shaft within the housing; an input shaft within the housing, the input shaft is configured for being in a first position in which rotation of the input shaft rotates the output shaft, and a second position that is axially offset from the first position, in which rotation of the input shaft does not rotate the output shaft; a solenoid coil within the housing that, when energized, moves the input shaft to the second position; and a spring within the housing that, when the solenoid coil is not energized, moves the input shaft to the first position.

16 Claims, 2 Drawing Sheets

BALANCED HARMONIC DRIVE WITH OUTPUT SHAFT DISCONNECT

BACKGROUND

The application is directed to a harmonic drive and more specifically to a balanced harmonic drive with a shaft disconnect.

Control surfaces of aircraft may be maneuvered with a harmonic drive having a relatively small diameter and high ratio gearing. Strait or pancake style harmonic drives may be inefficient for this purpose. Also, when there is a jammed gear or a frozen motor, a fixed coupling between the motor and a control surface via the harmonic drive may result in undesirable constraints on motion of the control surface.

BRIEF SUMMARY

Disclosed is a harmonic drive, comprising: a housing; an output shaft within the housing; an input shaft within the housing, the input shaft is configured for being in a first position in which rotation of the input shaft rotates the output shaft, and a second position that is axially offset from the first position, in which rotation of the input shaft does not rotate the output shaft; a solenoid coil within the housing that, when energized, moves the input shaft to the second position; and a spring within the housing that, when the solenoid coil is not energized, moves the input shaft to the first position.

In addition to one or more aspects of the drive, or as an alternate, the housing is hollow and extends axially from a first outer end to a second outer end; the input shaft extends axially from a first side to a second side, the side first faces the first outer end of the housing and the second side faces the second outer end of the housing; and the solenoid coil is disposed at the second outer end of the housing and the defines a center aperture.

In addition to one or more aspects of the drive, or as an alternate, the housing includes a radially extending perimeter wall that extends within the housing a the first outer end of the housing, and a radially extending partition wall that extends within the housing between the first and second outer ends to define a first cavity between the partition wall and the first outer end, and a second cavity between the partition wall and the second outer end, wherein the perimeter wall defines a first input shaft aperture and the partition wall defines a second input shaft aperture; and the input shaft is within the first cavity and the solenoid is in the second cavity, wherein the input shaft has a raised shoulder having a first side that faces the first outer end of the housing and a second side that faces the second outer end of the housing, and the spring extends between the partition wall to the shoulder of the input shaft.

In addition to one or more aspects of the drive, or as an alternate, the input shaft has a raised center portion located on the shoulder and that defines a wave generator profile; and the drive includes: a wave generator bearing set disposed radially against the wave generator profile of the input shaft and axially fixed against the input shaft so that when the input shaft moves axially, the wave generator bearing set moves axially with the input shaft; a flex spline within the first cavity, having a first outer end at the perimeter wall and a second outer end at the partition wall, and the flex spline defines an outer facing spline and the output shaft defines an inner facing gear set that meshes with the outer facing spline, wherein when the input shaft is in the first position, the center portion is aligned with the outer facing spline and mates with the wave generator profile of the input shaft via the wave generator bearing set, and when the input shaft is in the second position, the center portion, and wave generator bearing set, are axially offset from the outer facing spline.

In addition to one or more aspects of the drive, or as an alternate, the wave generator bearing extends axially from a first side to a second side; a first thrust washer disposed radially against the first side of the shoulder and axially against the first side of the wave generator bearing set; and a second thrust washer disposed radially against the second side of the shoulder and axially against the second side of the wave generator bearing set.

In addition to one or more aspects of the drive, or as an alternate, the drive further includes a first containment washer disposed radially against the first side of the shoulder and axially against the first thrust washer to prevent movement of the first thrust washer against the input shaft; and a second containment washer disposed radially against the second side of the shoulder and axially against the second thrust washer to prevent movement of the second thrust washer against the input shaft, wherein when the input shaft moves between the first and second positions, the containment washers move the wave generator bearing set with the input shaft.

In addition to one or more aspects of the drive, or as an alternate, the flex spline includes: a first spline segment that is cup-shaped, having a first spline base at the first outer end of the flex spline and a first spline wall that extends from the first spline base to a first splined end defining a first portion of the outer facing spline; and a second spline segment that is cup-shaped, having a second spline base at the second outer end of the flex spline and a second spline wall that extends from the second spline base to a second spline end defining a second portion of the outer facing spline.

In addition to one or more aspects of the drive, or as an alternate, the housing as a housing outer wall; and an output flange aperture is defined in the housing outer wall, so that the output flange aperture is disposed axially along the first cavity; and an output flange, connected to the output shaft, extends outwardly from the output shaft, through the output flange aperture.

In addition to one or more aspects of the drive, or as an alternate, the perimeter wall includes a perimeter wall arm extending axially into the first cavity to a first inner arm end; the partition wall includes a partition wall arm extending axially into the first cavity to a second inner arm end, and the drive includes: a first thrust bearing disposed against the first inner arm end and engages the first side of the shoulder when the input shaft is in the first position; and a second thrust bearing disposed between the spring and the second side of the shoulder, and engages the second inner arm end when the input shaft is in the second position.

In addition to one or more aspects of the drive, or as an alternate, the drive further includes a first input shaft bearing that engages the first side of the input shaft; a second input shaft bearing that engages the second side of the input shaft, and wherein the perimeter wall arm defines a first recess for seating the first input shaft bearing; and the partition wall defines a second recess for seating the second input shaft bearing.

In addition to one or more aspects of the drive, or as an alternate, the first spline base defines a first center aperture that is configured to receive the perimeter wall arm so that the perimeter wall arm separates the first spline base and the first input shaft bearing; and the second spline base defines a second center aperture that is configured to receive the partition wall arm so that the partition wall arm separates the second spline base and the spring.

In addition to one or more aspects of the drive, or as an alternate, the output shaft has: a center portion; a first output shaft arm extending toward the first outer end of the housing from the center portion of the output shaft; and a second output shaft arm extending toward the second outer end of the housing from the center portion of the output shaft, and the drive further includes: a first output shaft bearing disposed between the first output shaft arm and the housing; and a second output shaft bearing disposed between the second output shaft arm and the housing.

In addition to one or more aspects of the drive, or as an alternate, the housing defines an output shaft recess that seats the center portion of the output shaft, thereby axially securing the output shaft within the housing.

In addition to one or more aspects of the drive, or as an alternate, the housing defines a split housing, and includes: a first housing segment extending from the first outer end of the housing to a first inner end of the first housing segment; and a second housing segment extending from the second outer end of the housing to a second inner end of the second housing segment, wherein the first and second inner ends of the housing segments are disposed within the first cavity.

In addition to one or more aspects of the drive, or as an alternate, the output flange aperture is defined between the first and second inner ends of the housing segments.

In addition to one or more aspects of the drive, or as an alternate, the output shaft recess is defined at the second inner end of the second housing segment.

Disclosed is an aircraft including: a control surface; a motor; and a drive having one or more of the aspects disclosed herein, coupled to the control surface, wherein the motor is coupled to the input shaft and the control surface is coupled to the output flange.

In addition to one or more aspects of the aircraft, or as an alternate, the control surface is a wing flap.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
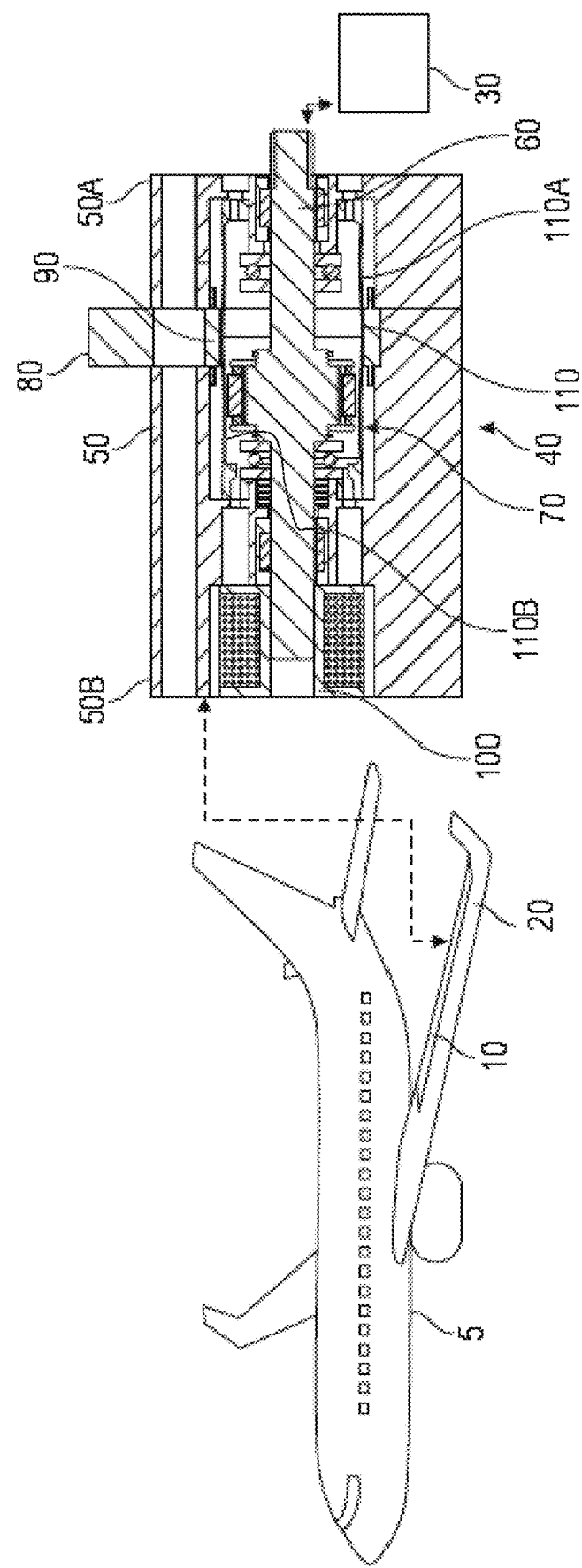
FIG. 1 shows a sectional view of a harmonic drive according to an embodiment operationally connected to an aircraft control surface and a motor, where the drive is in a disconnect state.

Turning to FIG. 1, an aircraft 5 includes a control surface 10, which may be a flap or slat of a wing 20 or other control surface of an aircraft, a motor 30 and a harmonic drive 40 coupled to the control surface 10 that receives rotational energy from the motor 30 and provides it to the control surface 10.

As disclosed in greater detail below, the harmonic drive 40 has a housing 50. As shown, the housing 50 is a split housing and includes first and second housing segments S0A, S0B. A harmonic gear 70 is disposed in the housing 50. The gear 70 includes an input shaft 60 and an output shaft 90. The input shaft 60 can include a wave generator profile 65, discussed below. As shown, the output shaft 90 includes an output flange 80. The output shaft 90 can either be coupled/connected to and driven by the input shaft 60 or de-coupled/disconnected from the input shaft as more fully explained below. The output flange 80 extends outwardly from the housing 50.

A solenoid coil 100 can be disposed in the housing 50 such that it surrounds a portion of the input shaft.

When the solenoid 100 is powered a current passes through it and generates a magnetic field. The magnetic field can interact with the input shaft to move the input shaft and places the harmonic drive 40 in a disconnected state. When the solenoid coil 100 is not energized, the harmonic drive 40 is in a normal state, and the input shaft 60 and output shaft 90 are rotationally coupled. That is, the output shaft 90 rotates with rotation of the input shaft 60. When the solenoid 100 is energized, the harmonic drive 40 is in the disconnect state, and the input shaft 60 and output shaft 90 are rotationally decoupled. That is, the output shaft 90 does not rotate with rotation of the input shaft 60.

The harmonic drive also includes a flex spline 110. The flex spline 110 illustrated in FIG. 1 can be a split spline having first and second spline segments 110A, 110B. Both the first and second spline segments 110A, 110B can be cup-shaped in one embodiment. The split configuration of the spline 110 and the housing 50 enables simplified assembly of the harmonic drive 40 but the spline need not always be split.

Figure 2:
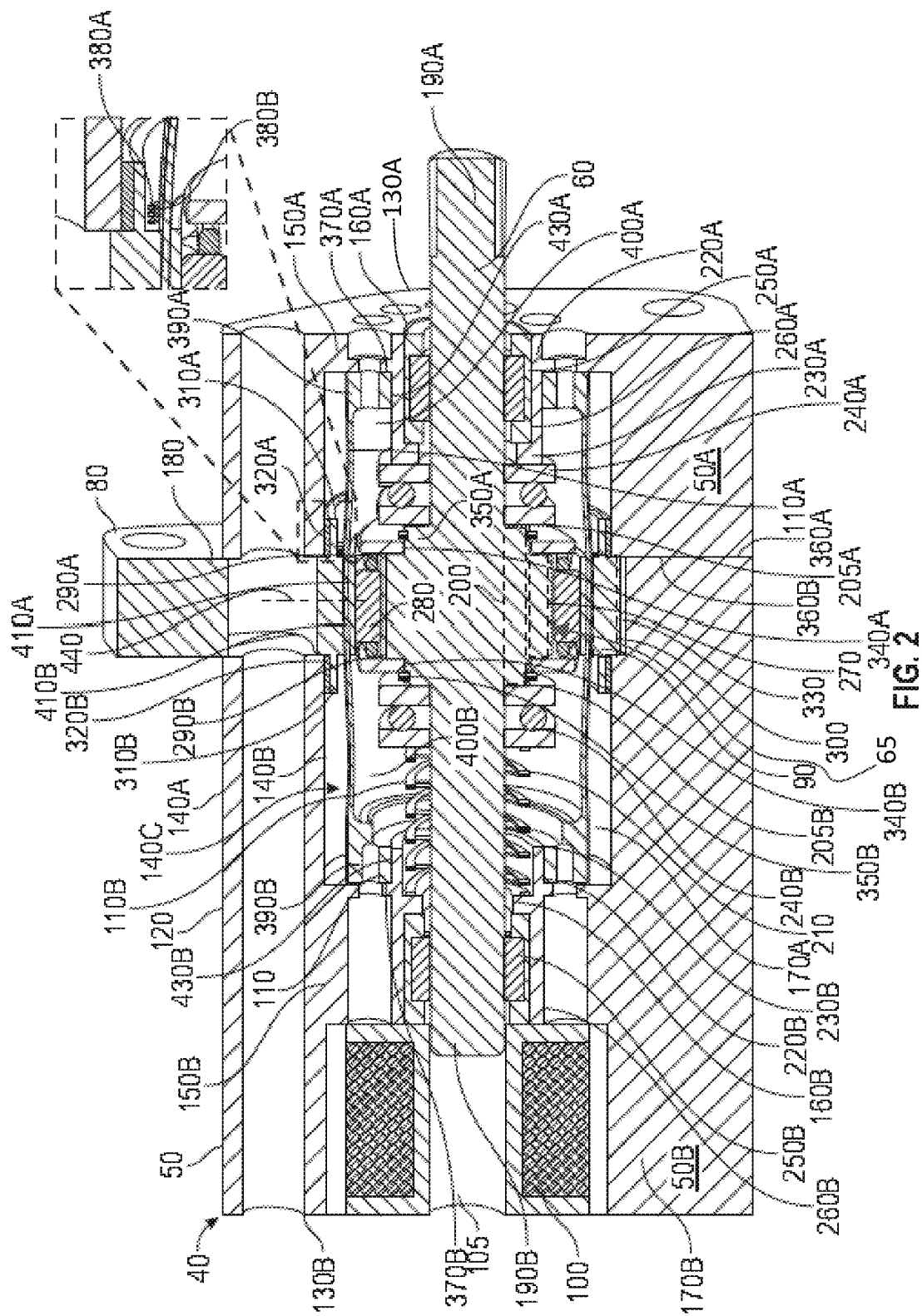
FIG. 2 shows the sectional view of the harmonic drive in a normal state.

Turning to FIG. 2, additional details of the harmonic drive 40 are explained. The housing 50 can be hollow in one embodiment. The housing 50 can include a housing outer wall 120 that extends axially from a first outer end 130A of the housing 50 to a second outer end 130B of the housing 50. The inner side 140B may define a channel 140C.

A perimeter wall 150A may be disposed within the channel 140C, at the first outer end 130A, which may define a first input shaft aperture 160A. A partition wall 150B may be disposed within the channel 140C, between the first and second outer ends 130A, 130B of the housing 50, and may define a second input shaft aperture 160B. The partition wall 150B may divide the channel 140C into a first cavity 170A is between the perimeter wall 150A and the partition wall 150B, and a second cavity 170B between the partition wall 150B and the second outer end 130B. An output flange aperture 180 is defined in the housing outer wall 120. The output flange aperture 180 extends into the first cavity 170A. The output flange 80, connected to the output shaft 90, extends outwardly from the output shaft 90, through the output flange aperture 180.

The input shaft 60 is disposed within the first cavity 170A. The shaft includes a first side 190A that extends through the first input shaft aperture 160A. The input shaft also includes a second side 190B that extends through the second input shaft aperture 160B. The input shaft 60 is configured so that in the first and second position of the input shaft 60, e.g., regardless of whether the solenoid 100 is energized, a portion of the first side 190A of the input shaft 60 is exterior to the first outer end 130A of the housing 50 and a portion of the second side 190B of the input shaft 60 is within or adjacent to the solenoid 100.

The solenoid 100 is within the second cavity 170B. The solenoid 100 is operable between a first mode and a second mode. In the first mode, the solenoid 100 is not energized, the input shaft 60 is in a first axial position (or first position) (FIG. 2), and is rotationally coupled with the output shaft 90. This corresponds to the normal state of the drive 40. In the second mode, the solenoid 100 is energized, a magnetic field created by the solenoid draws the input shaft 60 to a second axial position (or second position) (FIG. 1) so that the input shaft 60 is rotationally decoupled, or disconnected, from the output shaft 90. This corresponds to the disconnect state of the drive 40. That is, in the first mode (not energized) of the solenoid 100 (the normal state of the drive 40), rotation of the input shaft 60 rotates the output shaft 90. In the second mode (energized) of the solenoid 100 (the disconnect state of the drive 40), rotation of the input shaft 60 does not rotate the output shaft 90, because of the relative axial positioning of the input and output shafts 60, 90. The solenoid 100 may have a center aperture 105 that is configured to receive the second side 190B of the input shaft 60 when the input shaft 60 is in the second position.

The input shaft 60 includes a shoulder 200 having a first side 205A that faces the first outer end 130A of the housing 50 and a second side 205B that faces the second outer end 130B of the housing 50. The drive includes a spring 210 extending between the partition wall 150B and the second side 205B of the shoulder 200 of the input shaft 60. The spring 210 biases the input shaft 60 from the second position to the first position, which is effective when the solenoid 100 is not energized. However, the solenoid 100, when energized, is powerful enough to overcome the spring forces of the spring 210 and move the input shaft 60 to the second (disconnect) position.

The perimeter wall 150A includes a perimeter wall arm 220A. The perimeter wall arm 220A extends axially into the first cavity 170A to a first inner arm end 230A. The partition wall 150B includes a partition wall arm 220B. The partition wall arm 220B extends axially into the first cavity 170A to a second inner arm end 230B.

The drive 40 also includes a first thrust bearing 240A disposed against the first inner arm end 230A. The first thrust bearing 240A engages the first side 205A of the shoulder 200 when the input shaft 60 is in the first position. A second thrust bearing 240B is disposed between the spring 210 and the second side 205B of the shoulder 200. The second thrust bearing 240B engages the second inner arm end 230B when the input shaft 60 is in the second position.

The drive 40 also includes a first input shaft bearing 250A that engages the first side 190A of the input shaft 60 and a second input shaft bearing 250B that engages the second side 190B of the input shaft 60. The perimeter wall arm 220A defines a first recess 260A for seating the first input shaft bearing 250A and the partition wall 150B defines a second recess 260B for seating the second input shaft bearing 250B.

As indicated, the input shaft 60 includes a center portion 270 that is axially centered on the shoulder 200 and defines the wave generator profile 65. A wave generator bearing set 280 is disposed against the center portion 270 of the input shaft 60 and extends axially from a first side 290A to a second side 290B. When the input shaft 60 is in the first position, the wave generator bearing set 280 is axially aligned with the output shaft 90. When the input shaft 60 is in the second position, the wave generator bearing set 280 is axially offset from the output shaft 90.

A first thrust washer 340A is disposed radially against the first side 205A of the shoulder 200 and axially against the first side 290A of the wave generator bearing set 280. A second thrust washer 340B is disposed radially against the second side 205B of the shoulder 200 and axially against the second side 290B of the wave generator bearing set 280.

A first containment washer (or clip) 350A is disposed radially against the first side 205A of the shoulder 200 and axially against the first thrust bearing 240A, to prevent movement of the first thrust bearing 240A against the input shaft 60. A second containment washer 350B is disposed radially against the second side 205B of the shoulder 200 and axially against the second thrust bearing 240B to prevent relative movement of the second thrust bearing 240B against the input shaft 60.

By utilizing the first and second containment washers 350A, 350B, when the input shaft 60 moves from the first position (FIG. 2) to the second position (FIG. 1), the thrust washers 340A, 340B move the wave generator bearing set 280 with the input shaft 60. This decouples the wave generator bearing set 280 from the spline 380B of the flex spline 110. As a result, the spline 380B will not be engaged by the input shaft 60 and will not engage the gear set 380A of the output shaft 90.

With the disclosed embodiments, the input shaft 60 will not drive, and will also not prevent free rotation, of the output shaft 90 and output flange 80 when the solenoid coil 100 is energized. As a result, energizing the solenoid 100 enables free rotation of the output flange 80, and thus free movement of a control surface 10 coupled to the output flange 80. In operation of an aircraft 5, for example, if the motor 30 should fail to function properly, energizing the solenoid 100 will allow the control surface 10 to freely rotate to a position that minimizes air resistance.

The output shaft 90 has a center portion 300, a first output shaft arm 310A that extends toward the first outer end 130A of the housing 50 from the center portion 300 of the output shaft 90. A second output shaft arm 310B extends toward the second outer end 130B of the housing 50 from the center portion 300 of the output shaft 90. A first output shaft bearing 320A is disposed between the first output shaft arm 310A and the housing 50. A second output shaft bearing 320B is disposed between the second output shaft arm 310B and the housing 50.

The housing 50 also defines an output shaft recess 330 that seats the center portion 300 of the output shaft 90. This axially secures the output shaft 90 withing the housing 50.

The housing 50 defines the split housing with the first housing segment 50A extending from the first outer end 130A to a first inner end 360A. The second housing segment 50B extends from the second outer end 130B of the housing 50 to a second inner end 360B of the second housing segment 50B. The first and second inner ends 360A, 360B of the housing segments 50A, 50B are within the first cavity 170A.

The output flange aperture 180 is defined between the first and second inner ends 360A, 360B of the housing segments 50A, 50B. The output shaft recess 330 is defined at the second inner end 360B of the second housing segment 50B.

The flex spline 110 is disposed within the first cavity 170A. The flex spine 110 has a first outer end 370A located at the perimeter wall 150A, between the inner side 140B of the housing 50 and the perimeter wall arm 220A The flex spine also includes a second outer end 370B is disposed at the partition wall 150B, between the inner side 140B of the housing 50 and the partition wall arm 220B. The output shaft 90 defines an inner facing gear set 380A and the flex spline 110 defines an outer facing spline 380B that meshes with the inner facing gear set 380A in each operable mode of the solenoid 100. This is because the output shaft 90 does not move axially with the input shaft 60. However, the spline 380B only engages the gear set 380A when the solenoid 100 is not energized, the input shaft 60 is in the first position, and the wave generator bearing set 280 is axially aligned with the spline 380B during rotation of the input shaft 60. That is, when the solenoid 100 is energized, the input shaft 60 is in the second position, and the wave generator bearing set 280 is axially offset from the spline 380B during rotation of the input shaft 60, and the spline 380B does not engage the gear set 380A.

The flex spline 110 includes two spine segments 110A, 110B. The first spline segment 110A is cup-shaped, defined by a first spline base (or flange) 390A at the first outer end 370A of the flex spline 110 and a first spline wall (or tube) 400A that extends from the first spline base 390A to a first splined end 410A. The first spline segment 110A surrounds a portion of the first side 190A of the input shaft 60 and the first thrust bearing 240A. The second spline segment 110B is also cup-shaped, having a second spline base 390B at the second outer end 370B of the spline 110 and a second spline wall 400B that extends from the second spline base 390B to a second splined end 410B. That is, the spline segments 110A, 110B face each other within the first cavity 170A. The second spline segment 110B surrounds a portion of the second side 190B of the input shaft 60 and the second thrust bearing 240B.

The first spline base 390A defines a first center aperture 430A that is configured to receive the perimeter wall arm 220A so that the perimeter wall arm 220A separates the first spline base 390A and the first input shaft bearing 250A. The second spline base 390B defines a second center aperture 430B that is configured to receive the partition wall arm 220B so that the partition wall arm 220B separates the second spline base 390B and the spring 210. The first inner end 410A of the first spline segment 110A and the second inner end 420B of the second spline segment 110B are disposed at an axial center 440 of the output shaft 90.

It is to be appreciated that the split configuration of the housing enables the installation of the split cup-type flex spline. As a result, the embodiments provide a cup-type harmonic drive. The cup-type harmonic drive has a higher operational efficiency than, for example, a strait or pancake style harmonic drive. However, such other configurations are within the scope of the disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure includes only some of the described embodiments. Accordingly, the present disclosure is not to be seen as limited by the foregoing description, but is only limited by the scope of the appended claims.

What is claimed is:

1. A harmonic drive, comprising:
a housing;
an output shaft within the housing;
an input shaft within the housing, the input shaft is configured for being in a first position in which rotation of the input shaft rotates the output shaft, and a second position that is axially offset from the first position, in which rotation of the input shaft does not rotate the output shaft;
a solenoid coil within the housing that, when energized, moves the input shaft to the second position; and
a spring within the housing that, when the solenoid coil is not energized, moves the input shaft to the first position;
wherein:
the housing is hollow and extends axially from a first outer end to a second outer end;
the input shaft extends axially from a first side to a second side, the first side faces the first outer end of the housing and the second side faces the second outer end of the housing;
the solenoid coil is disposed at the second outer end of the housing and the defines a center aperture;
the housing includes a radially extending perimeter wall that extends within the housing at the first outer end of the housing, and a radially extending partition wall that extends within the housing between the first and second outer ends to define a first cavity between the partition wall and the first outer end, and a second cavity between the partition wall and the second outer end, wherein the perimeter wall defines a first input shaft aperture and the partition wall defines a second input shaft aperture; and
the input shaft is within the first cavity and the solenoid is in the second cavity, wherein the input shaft has a raised shoulder having a first side that faces the first outer end of the housing and a second side that faces the second outer end of the housing, and the spring extends between the partition wall to the shoulder of the input shaft.

2. The drive of claim 1, wherein:
the input shaft has a raised center portion located on the shoulder and that defines a wave generator profile; and
the drive includes:
a wave generator bearing set disposed radially against the wave generator profile of the input shaft and axially fixed against the input shaft so that when the input shaft moves axially, the wave generator bearing set moves axially with the input shaft;
a flex spline within the first cavity, having a first outer end at the perimeter wall and a second outer end at the partition wall, and the flex spline defines an outer facing spline and the output shaft defines an inner facing gear set that meshes with the outer facing spline, wherein when the input shaft is in the first position, the center portion is aligned with the outer facing spline and mates with the wave generator profile of the input shaft via the wave generator bearing set, and when the input shaft is in the second position, the center portion, and wave generator bearing set, are axially offset from the outer facing spline.

3. The drive of claim 2, wherein:
the wave generator bearing extends axially from a first side to a second side;
a first thrust washer disposed radially against the first side of the shoulder and axially against the first side of the wave generator bearing set; and
a second thrust washer disposed radially against the second side of the shoulder and axially against the second side of the wave generator bearing set.

4. The drive of claim 3, further comprising:
a first containment washer disposed radially against the first side of the shoulder and axially against the first thrust washer to prevent movement of the first thrust washer against the input shaft; and
a second containment washer disposed radially against the second side of the shoulder and axially against the second thrust washer to prevent movement of the second thrust washer against the input shaft,
wherein when the input shaft moves between the first and second positions, the containment washers move the wave generator bearing set with the input shaft.

5. The drive of claim 4, wherein:
the flex spline includes:
a first spline segment that is cup-shaped, having a first spline base at the first outer end of the flex spline and a first spline wall that extends from the first spline base to a first splined end defining a first portion of the outer facing spline; and
a second spline segment that is cup-shaped, having a second spline base at the second outer end of the flex spline and a second spline wall that extends from the second spline base to a second spline end defining a second portion of the outer facing spline.

6. The drive of claim 4, wherein:
the housing as a housing outer wall; and
an output flange aperture is defined in the housing outer wall, so that the output flange aperture is disposed axially along the first cavity; and
an output flange, connected to the output shaft, extends outwardly from the output shaft, through the output flange aperture.

7. The drive of claim 6, wherein:
the perimeter wall includes a perimeter wall arm extending axially into the first cavity to a first inner arm end;
the partition wall includes a partition wall arm extending axially into the first cavity to a second inner arm end, and
the drive includes:
a first thrust bearing disposed against the first inner arm end and engages the first side of the shoulder when the input shaft is in the first position; and
a second thrust bearing disposed between the spring and the second side of the shoulder, and engages the second inner arm end when the input shaft is in the second position.

8. The drive of claim 7, further comprising:
a first input shaft bearing that engages the first side of the input shaft;
a second input shaft bearing that engages the second side of the input shaft, and
wherein the perimeter wall arm defines a first recess for seating the first input shaft bearing; and
the partition wall defines a second recess for seating the second input shaft bearing.

9. The drive of claim 8, wherein:
the first spline base defines a first center aperture that is configured to receive the perimeter wall arm so that the perimeter wall arm separates the first spline base and the first input shaft bearing; and
the second spline base defines a second center aperture that is configured to receive the partition wall arm so that the partition wall arm separates the second spline base and the spring.

10. The drive of claim 9, wherein:
the output shaft has:
a center portion;
a first output shaft arm extending toward the first outer end of the housing from the center portion of the output shaft; and
a second output shaft arm extending toward the second outer end of the housing from the center portion of the output shaft, and
the drive further includes:
a first output shaft bearing disposed between the first output shaft arm and the housing; and
a second output shaft bearing disposed between the second output shaft arm and the housing.

11. The drive of claim 10, wherein:
the housing defines an output shaft recess that seats the center portion of the output shaft, thereby axially securing the output shaft within the housing.

12. The drive of claim 11, wherein:
the housing defines a split housing, and includes:
a first housing segment extending from the first outer end of the housing to a first inner end of the first housing segment; and
a second housing segment extending from the second outer end of the housing to a second inner end of the second housing segment,
wherein the first and second inner ends of the housing segments are disposed within the first cavity.

13. The drive of claim 12, wherein:
the output flange aperture is defined between the first and second inner ends of the housing segments.

14. The drive of claim 13, wherein:
the output shaft recess is defined at the second inner end of the second housing segment.

15. An aircraft including:
a control surface;
a motor; and
the drive of claim 14, coupled to the control surface, wherein the motor is coupled to the input shaft and the control surface is coupled to the output flange.

16. The aircraft of claim 15, wherein:
the control surface is a wing flap.

* * * * *